(12) United States Patent
Wang et al.

(10) Patent No.: US 7,415,718 B1
(45) Date of Patent: Aug. 19, 2008

(54) RECEIVING AND PROCESSING VERTICAL BLANKING INTERVAL DATA

(75) Inventors: Jason Wang, North Potomac, MD (US); Danita Kiser, Potomac Falls, VA (US); Jason Qin, Vienna, VA (US)

(73) Assignee: AOL LLC, Dulles, VA (US)

( * ) Notice: Subject to any disclaimer, the term of this patent is extended or adjusted under 35 U.S.C. 154(b) by 1385 days.

(21) Appl. No.: 09/867,578

(22) Filed: May 31, 2001

Related U.S. Application Data

(60) Provisional application No. 60/207,956, filed on May 31, 2000.

(51) Int. Cl.
*H04N 7/16* (2006.01)
*H04N 7/08* (2006.01)

(52) U.S. Cl. .................. 725/136; 725/137; 348/461; 348/464; 348/465; 348/467; 348/478

(58) Field of Classification Search ............. 725/38, 725/39, 54, 136–137; 348/461
See application file for complete search history.

(56) References Cited

U.S. PATENT DOCUMENTS

| | | | | |
|---|---|---|---|---|
| 5,485,221 A * | 1/1996 | Banker et al. | ............ | 348/563 |
| 5,583,560 A * | 12/1996 | Florin et al. | ............ | 725/40 |
| 5,592,551 A * | 1/1997 | Lett et al. | ............ | 380/211 |
| 5,621,579 A * | 4/1997 | Yuen | ............ | 386/121 |
| 5,659,368 A * | 8/1997 | Landis | ............ | 348/467 |
| 5,812,207 A * | 9/1998 | Cahill, III | ............ | 348/465 |
| 5,978,013 A * | 11/1999 | Jones et al. | ............ | 725/23 |
| 5,990,927 A * | 11/1999 | Hendricks et al. | ............ | 725/132 |
| 6,078,348 A * | 6/2000 | Klosterman et al. | ............ | 725/40 |
| 6,163,316 A * | 12/2000 | Killian | ............ | 715/721 |
| 6,172,677 B1 * | 1/2001 | Stautner et al. | ............ | 715/716 |
| 6,239,843 B1 * | 5/2001 | Gaudreau | ............ | 348/465 |
| 6,400,408 B1 * | 6/2002 | Berger | ............ | 348/465 |
| 6,469,749 B1 * | 10/2002 | Dimitrova et al. | ............ | 348/722 |
| 6,665,869 B1 * | 12/2003 | Ellis et al. | ............ | 725/39 |
| 2002/0056106 A1 * | 5/2002 | Takahashi et al. | ............ | 725/44 |
| 2005/0193413 A1 * | 9/2005 | Ellis et al. | ............ | 725/45 |

OTHER PUBLICATIONS

"Array." Microsoft Press Computer Dictionary. 3rd ed. 1997.*

\* cited by examiner

*Primary Examiner*—Chris Kelley
*Assistant Examiner*—Farzana E Hossain
(74) *Attorney, Agent, or Firm*—Fish & Richardson P.C.

(57) ABSTRACT

A system and method for receiving, processing, and storing electronic data transmitted in the vertical blanking interval of a video signal. The system provides a flexible mechanism for reading electronic data from video signals including those in National Television Systems Committee (NTSC) and Phase Alternation by Line (PAL) formats. Some implementations provide for receiving electronic programming guide data transmitted at a single byte rate or at multiple byte rates. The data is stored on a computer-readable medium such as a hardrive for further processing and use.

12 Claims, 13 Drawing Sheets

(Partial Software)

RECEIVING AND PROCESSING VERTICAL BLANKING INTERVAL DATA

This application claims priority from U.S. Provisional Application No. 60/207,956, filed on May 31, 2000, the contents of which are hereby incorporated by reference.

TECHNICAL FIELD

This invention generally relates to the transmission, reception, processing, and use of electronic data transmitted in the vertical blanking interval of a video signal.

BACKGROUND

Two standards for the broadcast and transmission of analog video signals are the National Television System Committee (NTSC) standard used in the United States, and the Phase Alternation by Line (PAL) standard used in many European countries. Under these standards, video images are displayed on a television screen using a video signal to control an electron beam that is scanned across the television screen. When the bottom of the screen is reached, the electron beam moves back to the top of the screen. During this transition, no video data may be transmitted. The portion of a video signal where no video information is broadcast is called the Vertical Blanking Interval (VBI) of the video signal.

In the NTSC format, 525 lines of video are displayed in each frame, with colors transmitted on a sub-carrier frequency of 3.579545 MHz. The NTSC standard defines a frame rate of 30 frames per second, half of the frequency of the 60 Hz electric power used in the United States. Each frame includes two interlaced fields of video data. The fields are displayed at the rate of 60 per second, and each field includes 262.5 lines of video image data. With each pass of the electron beam from the top of the display to the bottom, every other line of the display is updated. Thus, two passes are used to display a complete frame.

FIG. 1 shows the pattern that an electron beam follows according to the NTSC standard. The image begins with display of the first field of a frame at point 101. The electron beam follows the indicated path across the display to the end of row 3, then the beam retraces across the third raster line to the left side of the display. Next, the electron beam travels down to row 5 and then retraces across the fifth raster line to the left side of the display. This process continues until the electron beam reaches the bottom of the screen at point 102. The electron beam then travels to point 103 and begins the process again, this time tracing the even raster lines instead of the odd raster lines. When the beam reaches the bottom of the screen at point 104, the entire frame is complete; the beam retraces to point 101 and begins displaying the next frame.

Under the NTSC standard, the VBI includes the time required for the electron beam to reach point 101 from point 104 and the time required to reach point 103 from point 102. The video signal is ordinarily blanked out during this interval, preventing distortion of the image displayed. Because video is blanked, the video signal can be used to transmit data during this interval, perhaps including non-video information. Under the NTSC standard, the VBI yields 21 lines of data that are not displayed on the screen; however, lines 1-9 are reserved for vertical synchronization and line 21 is reserved for closed-captioning. Thus, 11 lines (lines 10-20) are available for transmitting data that may or may not relate to the displayed image.

The PAL standard uses a format similar to NTSC; however, PAL is used in Europe where the electrical power system is 50 Hz instead of 60 Hz. Consistent with this frequency, the frame rate for PAL is 25 frames per second, each field includes 625 lines of video, with and a sub-carrier frequency of 4.43 MHz is used to broadcast color information. The PAL standard reserves lines 6-22 in the first field of a frame and lines 319-335 in the second field of a frame to transmit VBI data, thus yielding 16 lines of data per frame for VBI information.

One commercial application of VBI data transmission is an electronic programming guide (EPG).

Another application that is being developed provides for the transmission of Internet Protocol packets via the VBI of an analog video signal. This proposal has been published as RFC 2728, an Internet Engineering Task Force (IETF) standards document.

SUMMARY

Among other features, data such as electronic programing guide data may be received, stored, and process in a manner that can be adapted easily to new and improved used of VBI transmissions.

A computer program capable of generating digital data representing information communicated in a vertical blanking interval of a video signal may include a receiving module that receives data representing information communicated in a vertical blanking interval of an analog video signal and a generating module that generates digital data based on the data received by the receiving module. The generating modules uses a predetermined algorithm to generate the digital data from the received data, which may represent non-video information. The received analog video signal may be, for example, a cable-broadcasted video signal, a satellite-broadcasted video signal, or a terrestrial broadcased video signal.

The computer program may be implemented as a software application and may also be used to generate various kinds of digital data, such as for example, an electronic programming guide. The generating module may include a converting module that may convert received data into a binary string. Additionally, the receiving module may periodically sample the received data and generate a numerical representation of the data using an array of values, which in turn may be converted into binary character strings.

The converting module may include an averaging module that computes the average of several of the array values. The converting module also may include a biasing module that biases the average to establish a cutoff value. Finally, the converting module may include a classifying module that classifies the data as electronic programming data based on whether the received data exceeds a cutoff value. The averaging module may compute a moving average based on the array values and the classifying module may classify data as a clock run if the average value exceeds a cutoff. Finally, the array of values may represent information including color information and control information.

Data derived from a video signal may be made accessible by receiving data derived from a vertical blanking interval of a video signal and storing the data received on a storage medium, such as a disk drive. Storing the data makes the data accessible to an application program interface. The received video signal may be a cable-broadcasted video signal and/or a satellite-broadcast video signal.

An electronic programming guide may be generated by receiving data derived from a vertical blanking interval of a video signal and generating an electronic programming guide based on the data. Data may be passed from within the vertical blanking interval of the video signal using a computer software program.

Generating an electronic programming guide also may include generating an electronic programming guide that includes one or more channel identifiers, a local time number, a channel name, a broadcasting day and date, a broadcasting start and end time, a program title, a program duration, a program category and index, one or more subcategories and indexes, a television rating (e.g., TVY_LV, TVPG), a program description, and indicators indicating whether the program is re-broadcasted, live, closed captioned, in stereo, and/or pay per view. Finally, the electronic programming guide may be driven by a data management module having application program interfaces capable of supporting a user interface, data loading and manipulation, and data mapping.

The details of one or more implementations are set forth in the accompanying drawings and the description below. Other features and advantages will be apparent from the description and drawings, and from the claims.

DETAILED DESCRIPTION

Figure 1:
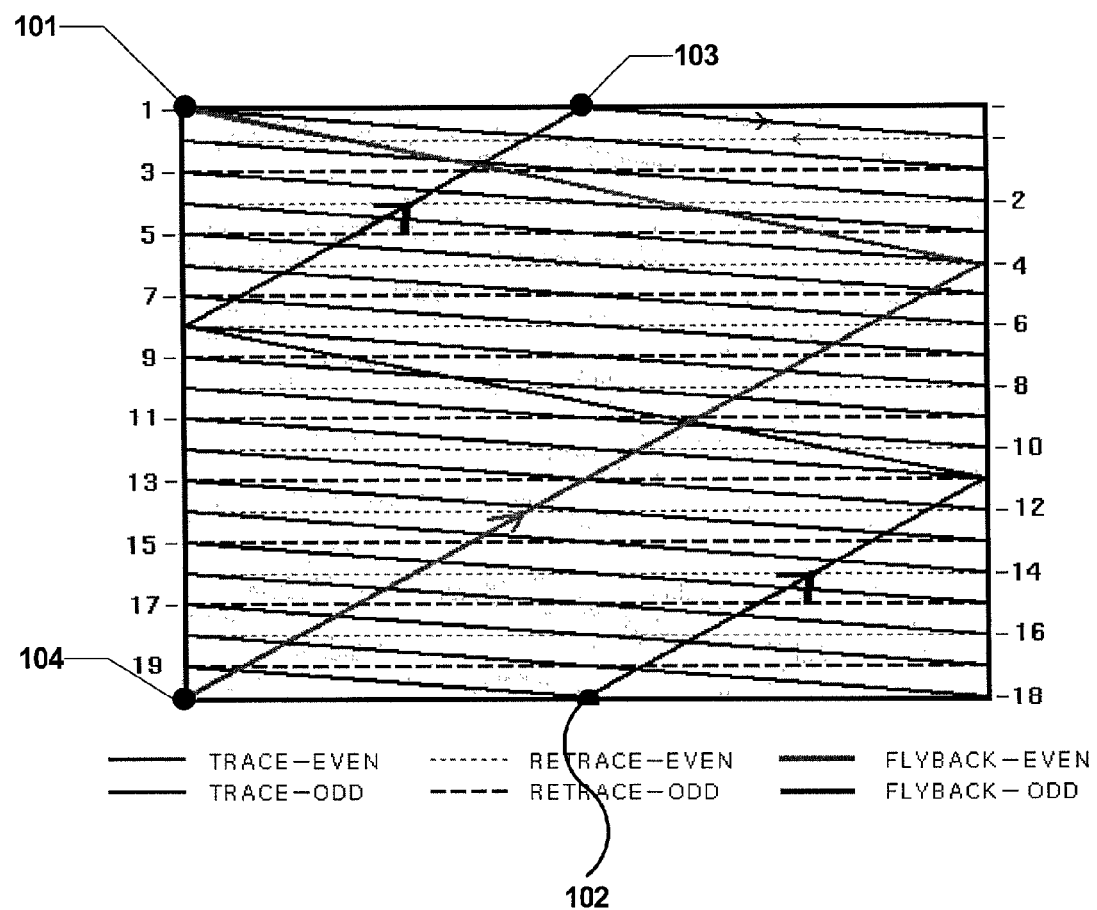
FIG. 1 is a diagram of a video display showing the movement of an electron beam across the video display according to the National Television Systems Committee (NTSC) standard.
Figure 2:
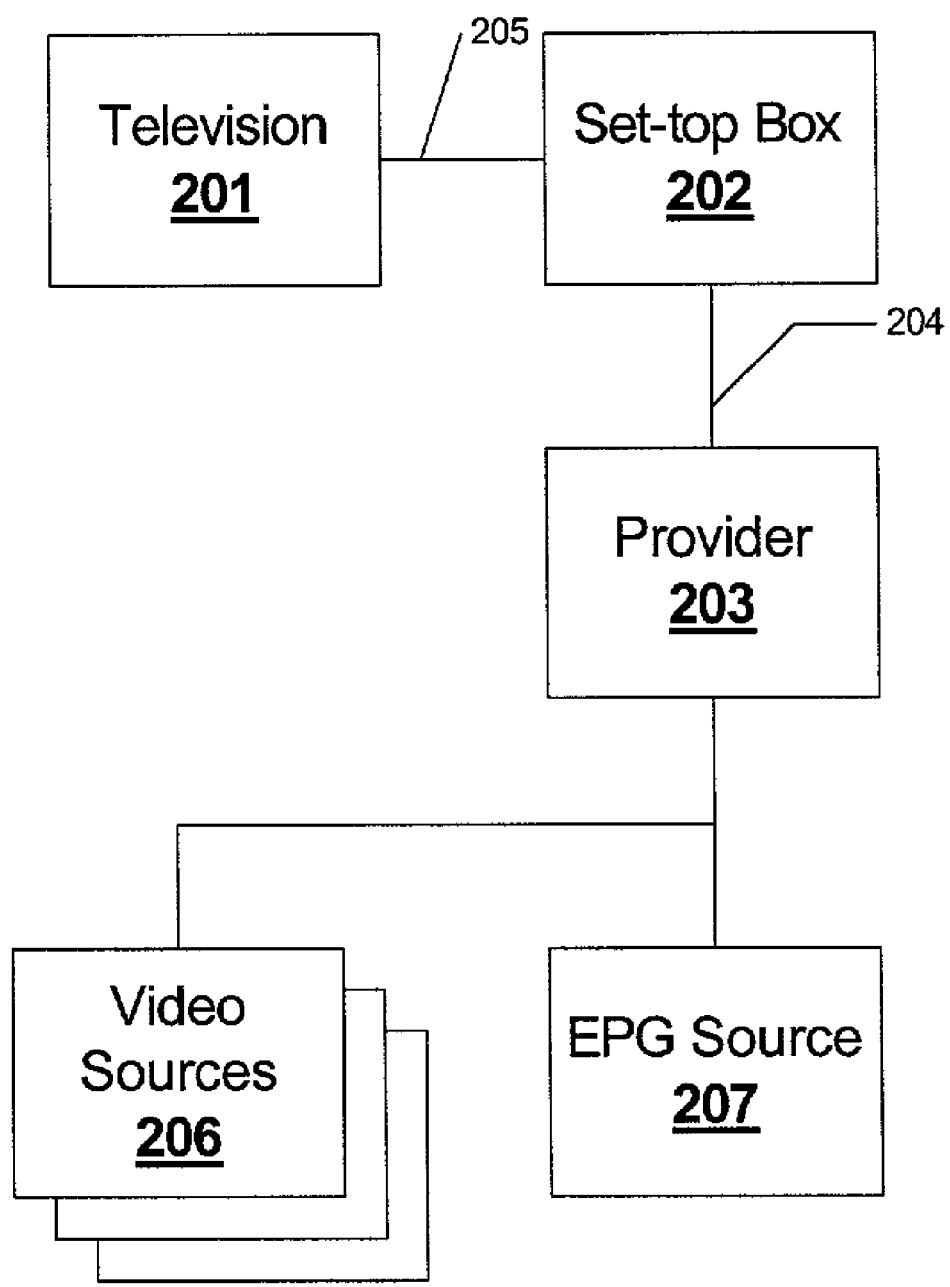
FIG. 2 is a block diagram showing a system for transmitting VBI data to a television through a set-top box.

FIG. 2 shows a block diagram of a system for providing EPG data for various video sources to a consumer. A television 201 is connected to a set-top box 202 that receives video signals from a provider 203 through a link 204. The set-top box 202 then performs any needed processing and transmits the video signal across link 205 to television 201. Some implementations may incorporate the functionality of the set-top box 202 into television 201 such that link 205 and a separate set-top box 202 are not needed.

Provider 203 receives video signals from various video sources 206. For example, video sources may include cable television channels such as CNN, ESPN, and MTV. The provider 20 usually receives the signals for all video sources 206 using a satellite receiver, or the like. In addition to the video sources 206, the provider 203 also receives programming data from an EPG source 207. For example, Tribune Media Services198 and TVData™ offer television programming data that can be purchased by providers 203 for transmission to their customers. The scheduling information received from EPG source 207 and the video signals received from video sources 206 can be combined by provider 203 for distribution to customers.

Provider 203 delivers entertainment and informational data and services to end-users by transmitting video signals to set-top box 202 through link 204, which can be embodied as a wire connection or as a radio frequency (RF) signal. For example, link 204 may be a satellite RF connection such as that used by DirecTV™, or it may be a conventional cable television wire connection.

The set-top box 202 receives the signal from provider 203, decodes the VBI information, and permits a user to display received video signals on television 201 through any standard video cable 205, such as an S-Video connection, composite audio/visual connection, or conventional cable television connection. The set-top box 202 may perform much of the processing of VBI data using hardware such as application-specific integrated circuits.

Additionally, set-top box 202 may store EPG data in random access memory (RAM) for use in displaying information regarding the show presently being shown, and in displaying a programming grid or other user interface listing programming information for various times and/or channels.

Figure 3A:
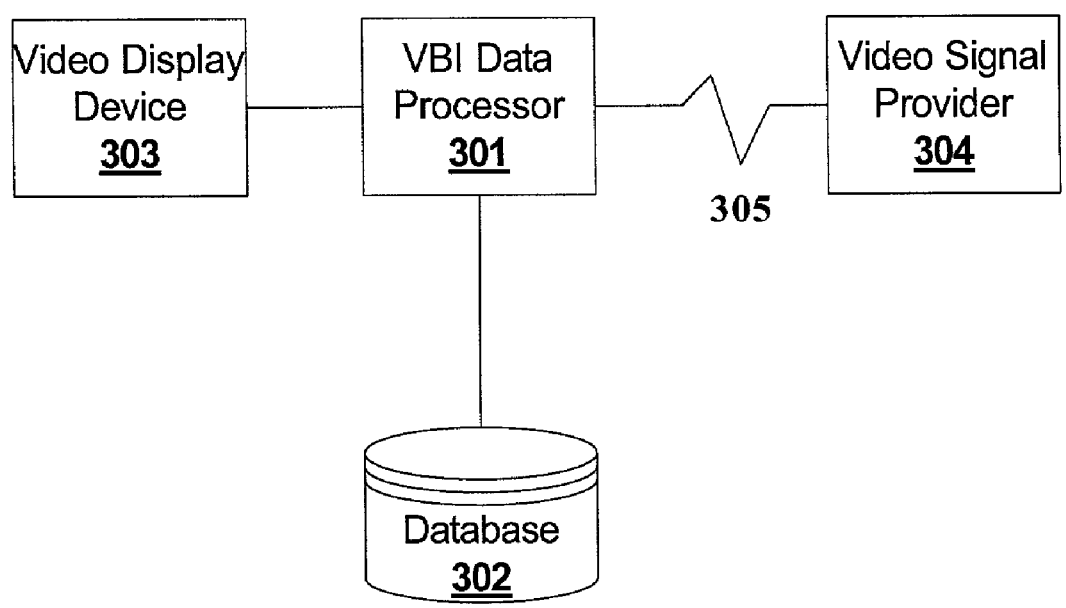
FIG. 3A is a block diagram showing a system for receiving, processing, and storing VBI transmitted data in the system of FIG. 2.

A framework may be employed for receiving, processing, storing, and accessing electronic information transmitted in the vertical blanking interval (VBI) of a video signal. Referring to FIG. 3A, a system may be provided for processing and displaying VBI-transmitted information. A VBI data processor 301, with access to data store 302 and video display device 303, receives a video signal transmitted by a video signal provider 304. The video signal provider 304 may be a cable company, a satellite company, a television broadcast station, or any other entity capable of transmitting video signals to users. VBI data processor 301 may be implemented using a computing device, such as a general-purpose computing device, an application-specific computing device, and the like. The video signal is transmitted across link 305, which may include wireless systems, such as systems capable of handling radio frequency transmissions and satellite transmissions, and wired systems, such as a conventional cable system, or combinations of the two.

At least a portion of the transmitted video signal is received and process by a VBI data processor 301, and stored into data store 302. Examples of a data processor include a general-purpose computer system such as that described below with reference to FIG. 3C. The VBI data processor 301 may display VBI transmitted data on video display device 303 which can be, for example, any device able to display video information including a conventional television, a computer monitor, and/or a high-definition television.

Data store 302 may be implemented as a simple database application as described herein; however, any commercially available database may be used for this purpose such as Oracle or Microsoft Access.

Figure 3B:
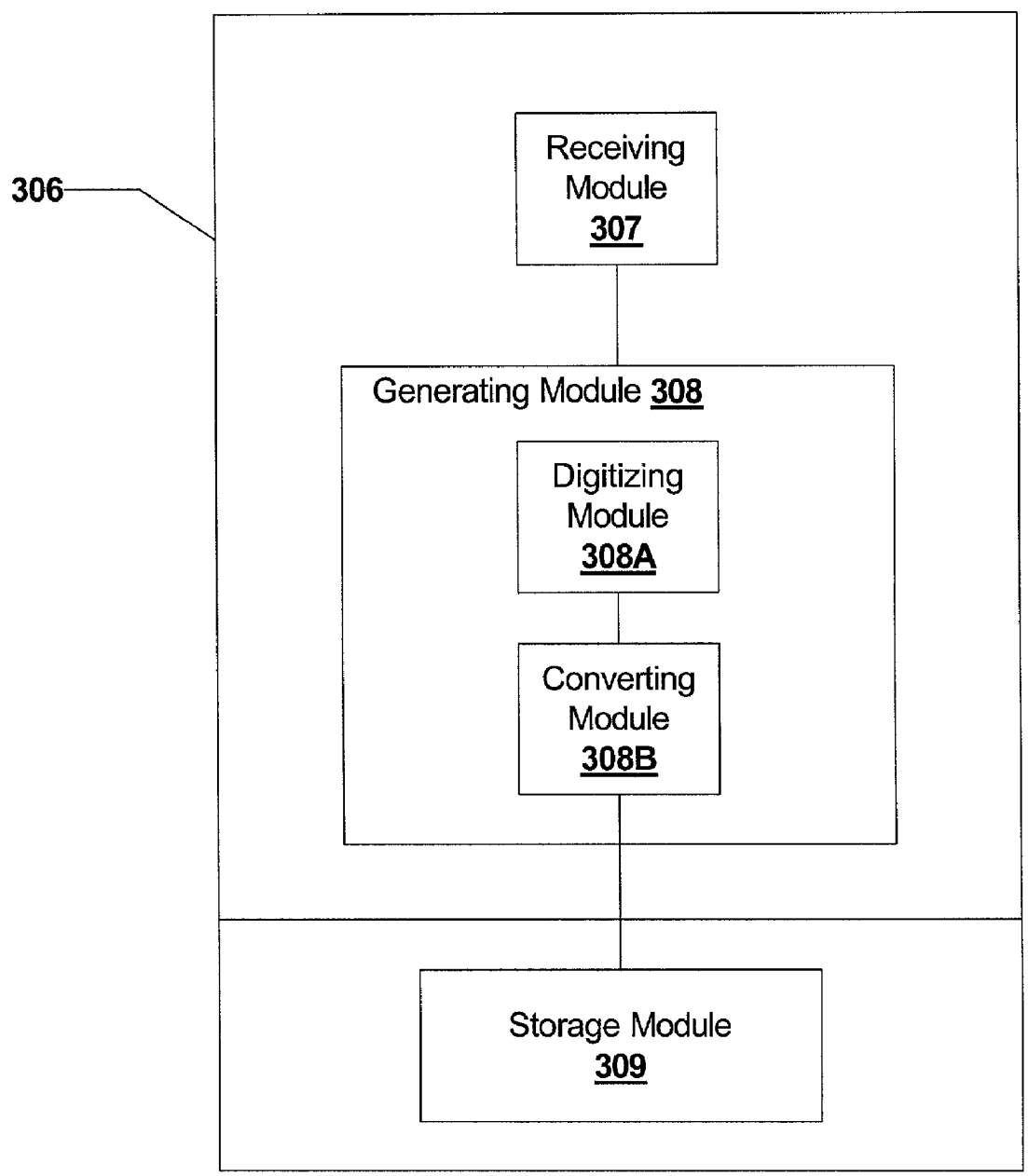
FIG. 3B is a block diagram describing a software implementation employed by the system of FIG. 3A.

Referring to FIG. 3B, a software application 306 residing on or accessible to VBI data processor 301 may include several components. Software application 306 generally includes a receiving module 307, a generating module 308, and a storage module 309, each including computer readable and performable instructions. The receiving module 307 is generally a code segment that receives at least a portion of the video signal from the video signal provider 304. A generating module 308 generally includes a code segment that processes the received signal and converts VBI data into a useful form that is stored in data store 302. As such, the generating module 308 may include a digitizing module 308A and a converting module 308B.

The digitizing module 308A samples at least the portion of the video signal corresponding to the vertical blanking interval and creates an array of values reflecting the sampled data. The array typically includes numerical values, for example, between 0 and 255, that are representative of the information received in the vertical blanking interval. These values may represent various information including, for example, color information and control information.

The converting module 308B is capable of generating at least one digital (e.g., binary) string from the array created by the digitizing module 308A by comparing each digital value in the array to one or more thresholds. Digital values below the threshold are assigned a first value (e.g., 0) and values at or above the threshold are assigned a second value (e.g., 1). For example, if the array is as follows [25, 42, 96, 29] and the threshold is 30, then the converting module 308B compares the first value to the threshold, determines that the first value is less than the threshold, and assigns a "0" to the first value. Similarly, the converting module 308B compares the second value to the threshold, determines that the second value exceeds the threshold, and assigns a "1" to the second value. In this example, the conversion process results in a string having the following value: "0110." This binary data string may be generated or converted to conform with an EPG data format.

The storage module 309 stores the data created by the generating module 308 in any suitable storage device, such as a hard disk drive, a floppy disk, a recordable compact disc, a random access memory (RAM), a magneto-optical platter; a tap, or any other computer readable medium. Initially, the character string may be stored in active or temporary memory. For example, the active memory may be static dynamic random access memory (SDRAM) or conventional random access memory (RAM). The character string then may be retrieved from the memory and communicated to a storage medium for storage, enabling large amounts of information to remain accessible to electronic programming guides and application program interfaces (APIs). An API, such as that described below with respect to FIGS. 4 and 5, may be used to read data from storage and format the data in a manner that is readable by an EPG user interface (UI) or some other (UI.

Some or all of the software application 306 describes with reference to FIG. 3B may be used to replace hardware otherwise used to process the digital array into a digital character string. By replacing hardware in this manner, flexibility may be enhanced. For instance, if the data within the vertical blanking interval is changed in type or format, the software program used to convert the video signal into a binary character string may be changed to recognize the newly communicated data type or format. Similarly, to accommodate a change in video source type (e.g., cable to satellite), the software program may be easily reconfigured to convert the new video signal format and to extract the data communicated within the vertical blanking interval, if necessary.

Furthermore, using a data store, such as data store 302, to store the digital data as a supplement or replacement for memory enables continued access to increased amounts of VBI data. More specifically, using the system and/or software described above, the digital data (generally a binary data string) representing VBI data may be stored within a storage medium (e.g., disk drive) in addition to, or instead of, being stored in memory (e.g., RAM). As such, an abundant amount of data can be stored and made accessible relatively inexpensively for long periods of time, enabling more detailed and longer lasting EPGs and the like.

Figure 4:
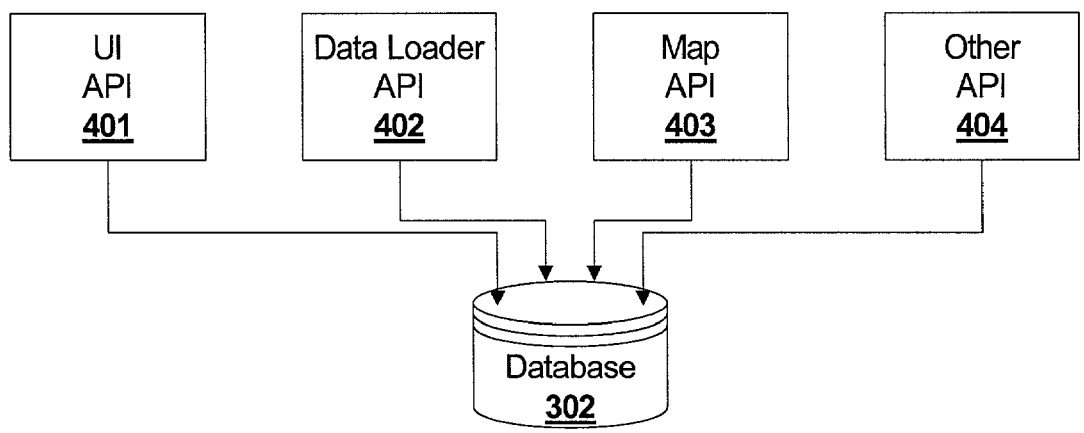
FIG. 4 is a block diagram showing several sets of application program interfaces (APIs) for accessing data in a database created using VBI transmitted data.

Referring to FIG. 4, several sets of APIs may be used to enable processing of VBI data, including the following: UI API 401, Data Loader API 402, Map API 403, and Other API 404. In one implementation for storing and processing VBI data, a data store 302 generally provides the ability to select, insert, update, and delete data with a library file.

Figure 5:
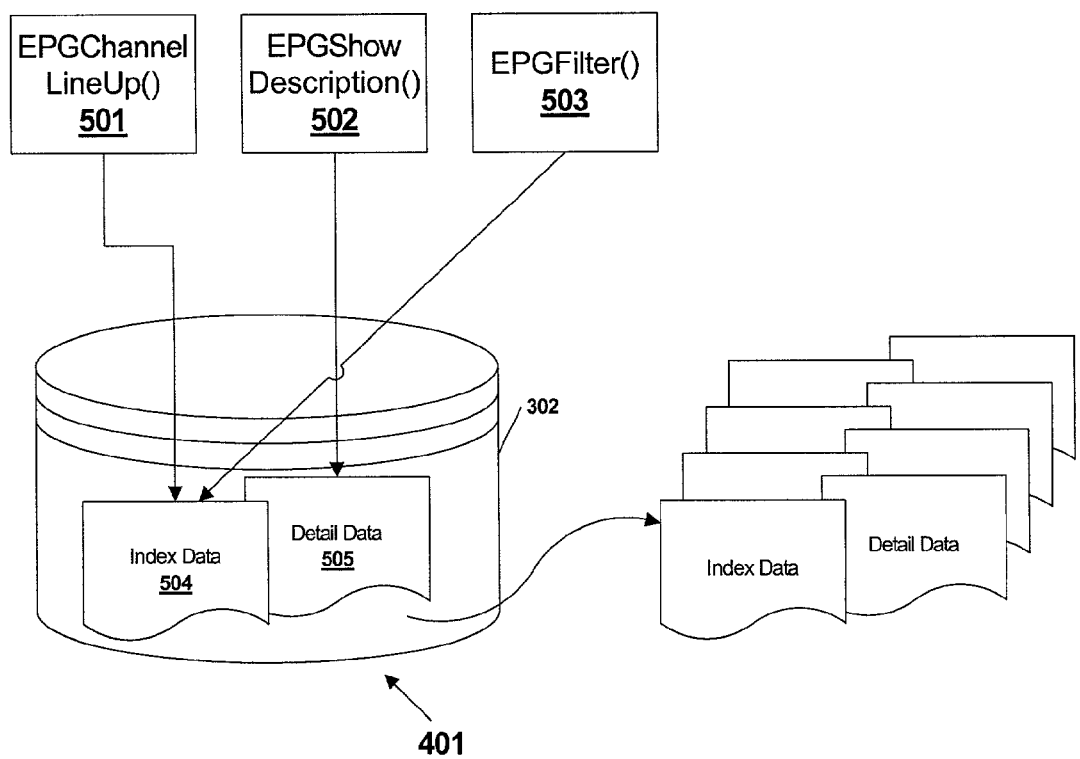
FIG. 5 is a block diagram describing a user interface API of the APIs of FIG. 4 for displaying data in a database created using VBI transmitted data.

A more detailed illustration of an example of the user interface (UI) API 401 is shown in FIG. 5. This API 401 provides a mechanism for accessing electronic programming guide data stored in data store 302. UI API 401 is designed to support queries such as the following: (1) listing shows at a particular time; (2) listing a show description; and (3) listing shows of a selected category at a particular time. Several functions that may be invoked using UI API 401 are illustrated by FIG. 5. Specifically, FIG. 5 shows an EPGChannelLineUp function 501, an EPGShowDescription function 502, and an EPGFilter function 503. These functions may be used to query data store 302, which may include, for example, index data 504 and detail data 505.

The EPGChannelLineup function 501, which is supported by UI API 401 represents a query that searches for shows at a particular time. Aspects of one implementation of EPGChannelLineup function 501 are described in Table 6A. The EPGChannelLineup function 501 may be called by a user interface (not shown) to display a list of brief show information for a given range of channels and a time frame. This function 501 receives, as input, a data structure including search criteria such as a start time, a stop time, a channel begin time, and a channel end time. This function 501 searches data store 302 based on the search criteria and builds an array containing information for each show including, for example, a channel number, a call letter or call letters of the channel, a start time, a duration, a category, a subcategory, a short title, and a reference number for the show. The function 501 returns TRUE if it is successful in performing the search and otherwise returns FALSE.

The EPGShowDescription function 502 represents another query supported by the UI API 401. This function 502 looks up a show description given a time and a show reference, and is described in great detail with reference to Tables 6A and 6B. This function 502 returns detailed show data including, for instance, the entire title, a short description, a full description, a category, a subcategory, the year produced, a television rating, a Motion Picture Association of America (MPAA) rating, an indication of the stars appearing in the show, and several Boolean values indicating whether the show is a rerun, live, closed captioned, and/or stereo telecast.

The EPGShowDescription function 502 receives, as input, a data structure including search criteria such as a date and a reference number identifying a show. These criteria are used to query data store 302 to obtain extended information about that particular show. This function 502 may be used, for example, to implement an interactive television system that permits a user to press a button to display detailed information about the show being shown. The function 502 returns TRUE if it is successful in performing the query and otherwise returns FALSE.

The show data returned by EPGChannelLineup function 501 typically is relatively short, such as, for example, about 48 bytes for each show. More detailed show data, such as that returned by EPGShowDescription function 502 typically is longer than the show data returned by EPGChannelLineup 501, and may be, for example, about 1024 bytes long.

These and various other functions may be used alone or together. For example, an application may use EPGChannelLineup function 501 to obtain a list of shows available at a given time. These shows may be displayed in a programming grid or some other graphical user interface. If a user selects an individual show, the application may call EPGShowDescription function 502 to return more detailed information regarding the show.

The EPGFilter function 503 represents yet another query supported by the UI API 401. This function 503 looks up one or more shows stored in an EPG using, for example, a show category and time. For example, this function 503 may support a query such as the following: "List all sporting events beginning at 8 pm."

Aspects of one implementation of the EPGFilter function 503 are described in detail with reference to Table 6B. This function 503 may be used to identify shows having a specified category-index and subcategory-index. The category-index and subcategory-index typically are numbered, for example, between 0 and 15; however, these limits can be changed to accommodate any number of categories.

The EPGFilter function 503 receives, as input, a data structure including search criteria, such as, for example, a category index, a subcategory index, a begin time, and an indicator of whether a forward or backward search is to be performed. This function 503 searches the data store 302 and builds an array storing all shows matching the search criteria. The function 503 returns TRUE if it is successful in performing the search and otherwise returns FALSE.

The functions discussed above provide the basic ability to build a UI. Additional and/or alternative database queries also may be useful and users familiar with conventional database techniques will readily understand how to extend and modify this basic design to accommodate such use.

TABLE 6A

API for UI

1. EPGChannelLineup
   Description  Call this function to get a list of brief show information for a given range of channel numbers and time frame. The returned show array is sorted in the order of channel number and show beginning time.
   Prototype  Boolean EPGChannelLineup(const line_up & sline, show_info * const sinfo, int * const sorder, int &length, query_error & err);
   Parameters  •sline: IN PARAMETER. This structure specifies time grids and the range of channel numbers. The data structure is defined as:
   struct line_up
   {
       time_t time_grid_start;
       time_t time_grid_end;
       int channel_id_start;
       int channel_id_end;
   }
   •sinfo: OUT PARAMETER. sinfo is an array of type show_info.
   struct show_info
   {
       int channel_number;
       char call_letter[9];
       time_t begin_time;
       short duration;
       unsigned char cat_index;
       unsigned char sub_cat_index;
       char short_title[22];

TABLE 6A-continued

API for UI long reference_number;
   }
   •sorder: OUT PARAMETER. It stores the order of shows sorted in channel number and time. For example, sinfo[sorder[0]] is the first show, sinfo[sorder[1]] the second, etc.
   •length: IN OUT PARAMETER. As an in parameter, length is the dimension of sinfo and sorder, as an out parameter, it is the actual number of shows stored in sinfo and sorder, provided the number is less than the input length. Otherwise, FALSE is returned and err is populated with messages.
   •Err: OUT PARAMETER. This parameter holds error information if error occurs. Non-zero err_code means something wrong in the call. Query_error is defined as
   struct query_error
   {
       int err_code;
       char err_msg[100];
   }
   Return Value  TRUE: Success
   FALSE: Fails to prepare tables for data loading
2. EPGShowDescription
   Description  This function returns a detailed show data. In order to get detailed show info, caller needs to pass the beginning time (or date) and reference number of the show. Reference number of a show is obtained by calling EPGChannelLineup function.
   Prototype  Boolean EPGShowDescription(show_brief_info &sbrief, show_description & sdesc, query_error & err);
   Parameters  •sbrief: IN PARAMETER. The struct show_brief_info is defined as
   {
       time_t date
       long reference_number;

TABLE 6B

}
   sdesc: OUT PARAMETER. Detailed description of a show, including category, description, etc. The data structure is defined as
   struct show_description
   {
       char rest_of_title [100];
       char short_description[64];
       char description[801];
       char category[13];
       char subcategory[13];,
       short year_produced;
       float stars;
       bool re_run;
       bool live;
       bool closed_caption;
       bool stereo;
       char tv_rating[13];
       char mpaa_rating[5];
   }
   • err: OUT PARAMETER.
   Return Value  TRUE: Success
   FALSE: Fails to prepare tables for data loading.
3. EPGFilter
   Description  To get a list of shows having specified category-index and subcategory-index. Category-index and subcategory-index are numbers between 0 to 15.
   Prototype  Boolean EPGFilter( show_cat_info &scat, show_info * const sinfo, int * const sorder, int &length, query_error & err);
   Parameters  •scat: IN PARAMETER. The data struct show_cat_info is defined as
       struct show_cat_info TABLE 6B-continued

```
        {
            short cat__index;
            short sub__cat__index;
            time__t begin__time;
            unsigned char updown__flag;
        }
        Above data structure specifies category index,
        subcategory index, beginning time of a search,
        and forward or backward search flag.
        updown__flag = 1 means forward search,
        0 means backward search. The search is limited
        among the shows of the same day as, the specified
        beginning time.
        • sinfo: OUT PARAMETER. sinfo is an array of type
          show__info.
        • sorder: OUT PARAMETER. It stores the order of
          shows sorted in channel number and time. For
          example, sinfo[sorder[0]] is the first show,
          sinfo[sorder[1]] the second, etc.
        • length: IN OUT PARAMETER. As an in parameter,
          length is the dimension of sinfo and sorder, as an
          out parameter, it is the actual number of shows
          stored in sinfo and sorder, provided the number is
          less than the input length.
          Otherwise, FALSE is returned and err is populated
          with messages.
        • Err: OUT PARAMETER. This parameter holds error
          information if error occurs. Non-zero err__code
          means something wrong in the call.
Return  TRUE: Success
Value   FALSE: Fails to prepare tables for data loading.
```

Figure 6:
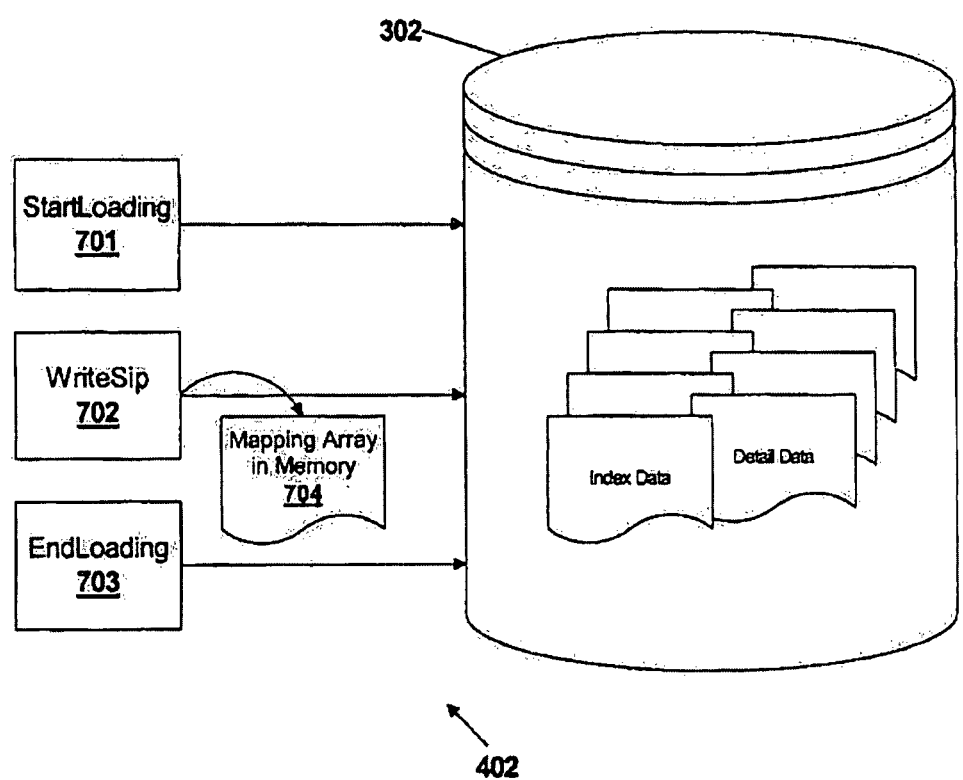
FIG. 6 is a block diagram describing a data-loading API of the APIs of FIG. 4 for loading data into a database created using VBI transmitted data.

The UI API 401 described above provides a mechanism for building user interfaces for accessing an electronic programming guide. FIG. 6 illustrates how the various functions interact with data store 302 to load data using the Data Loader API 402, including StartLoading function 701, WriteSIP function 702, and EndLoading function 703. The WriteSIP function 702 may use mapping array 704 which can be stored in memory. Functions provided in the Data Loader API 402 also are described in detail with reference to Tables 8A and 8B.

The StartLoading function 701 prepares data tables in data store 302 to accommodate the loading of new or additional data. This function 701 may be called before data loading begins. The WriteSIP function 702 loads the data and detail information stored regarding each show, as described with reference to Tables 8A and 8B. WriteSIP function 702 may use mapping array 704 to map channels to categories and vice versa. After all data has been loaded using the WriteSip function 702, the EndLoading function 703 may be called to commit the changes to the data store 302. This module may use transaction processing techniques to assure that the data store 302 is not left in an inconsistent state. When EndLoading function 703 is called, the system cleans up the data store 302 and updates all index and data tables in data store 302. By providing the StartLoading function 701 and the EndLoading function 702, the Data Loader API 402 allows information regarding many shows to be efficiently added to data store 302 while updating indexes and database tables a single time when the EndLoading function 703 is called. This greatly increases the efficiency of the data load process.

TABLE 8A

API for Data Loader

```
1.  TsipCallback::StartLoading
    Description   StartLoading is responsible for preparing database
                  tables for the data loading. Therefore, this function
                  must be called before data loading. After data loading
                  is done, EndLoading function shall be called.
    Prototype     Boolean StartLoading( )
    Parameters    None
    Return        TRUE: Success
    Value         FALSE: Fails to prepare tables for data loading.
2.  TsipCallback::StartSip
    Description   StartSip marks the beginning of the data loading of
                  a show information packet. A show information packet
                  contains 4-hour show data for one channel. EndSip
                  indicates the end of the data loading of one packet.
    Prototype     Boolean StartSip( )
    Parameters    None
    Return        TRUE: Success
    Value         FALSE: Fails to prepare tables for data loading.
3.  TsipCallback::WriteSip
    Description   WriteSip inserts one or couple of show data into
                  database tables.
    Prototype     Boolean WriteSip(const SipHeader &shdr,
                  const Showinfo *psi, int length)
    Parameters    •shdr: IN PARAMETER. SipHeader contains
                    common data stored by show
                    data stored in the array Showinfo.
                    struct
                    TUNECHAN {
                      unsigned char type;    // b0-2: 0:OTA 1:cable 2:satellite 3-7:reserved //
                                             b3:digital b4:dual A/B cable trunk b5-7:rsvd
                      unsigned short minor;  // up to 10 bits of digital minor channel
                      unsigned short major;  // up to 10 bits of digital major channel, or analog channel
                    }
                    struct SipHeader
                    {
                      short channel__id;   // unique channel ID
                      TUNECHAN tune__channel; // see struct definition above
                      char channel__name[9];   // (null terminated string)
                      unsigned char day__of week;// 0, 1, 2, 6 for Sun, . . . , Saturday, respectively
```

TABLE 8A-continued

API for Data Loader

```
        char date[9];      // YYYYMMDD null terminated
                           // on 4 hour intervals (0, 4, 8, 12, 16, 20)
   }
   *psi: IN PARAMETER Showinfo is defined as
       struct Showinfo
       {
       char short_title[22]; // short title, as displayed on grid titles
       char rest_of_title[100];    //concatenated with short title, the complete show title
       char short_description[64];   // short description. Enough descriptive text to fit 3 x 21
                                    // display. (includes ratings for movies, teams for sports,
                                    // subjects for talk shows, etc, char null terminated.
       char long_description[801]; // with short description, complete description
                                   // null terminated
       char begin_time[ 15 ];
```

TABLE 8B

```
                            // Show starting time with format of YYYYMMDDHHMI
                            // null terminated. MM takes a value of 01, . . . , 12;
                            // DD takes a value of 01, . . . , 31; HH takes a value of 00, . . . , 23;
                            // MI takes a value from 00 to 59.
       char end_time[15]; // as above, used for performance purpose
       int duration; // in minutes
       char category[13]; // category name, null terminated
       unsigned char cat_index;
       char subcategory[13]; // sub-category name, null terminated
       unsigned char sub_cat_index;
       short year_produced; // four digits, e.g., 1998. For search purpose
       float stars;         // 0, 0.5, 1, 1.5, 2, . . . , 4.5, 5 for search purpose
       bool re_run;
       bool live;
       boot closed_caption;
       bool stereo;
       char TV_rating[13]; // "TVMA-FVDLVS", "TVY-LV", . . . , null terminated
       char mpaa_rating[5]; // "NC17", "X", . . . , null terminated
       };
           psi is the pointer of the array Showinfo psi[length].
           *length: IN PARAMETER. length tells how many show records in the array psi.
       Return TRUE: Success
       Value FALSE: Fails to prepare tables for data loading.
4. TsipCallback::EndSip
   Description EndSip marks the end of the data loading of a show information packet.
       Prototype Void EndSip( )
       Parameters None Return
           Void Value
5. TsipCallback::EndLoading
   Description   After data loading is suc&essfully completed, Data Loader calls EndLoading to
                 invoke a sequence of actions on the database tables, such as clean up temporary
                 tables and etc. If, for some reason, this API is not called, then show data for UI
                 will not be updated.
   Prototype     Void EndLoading( )
   Parameters    None Return Void
       Value
```

Figure 7:
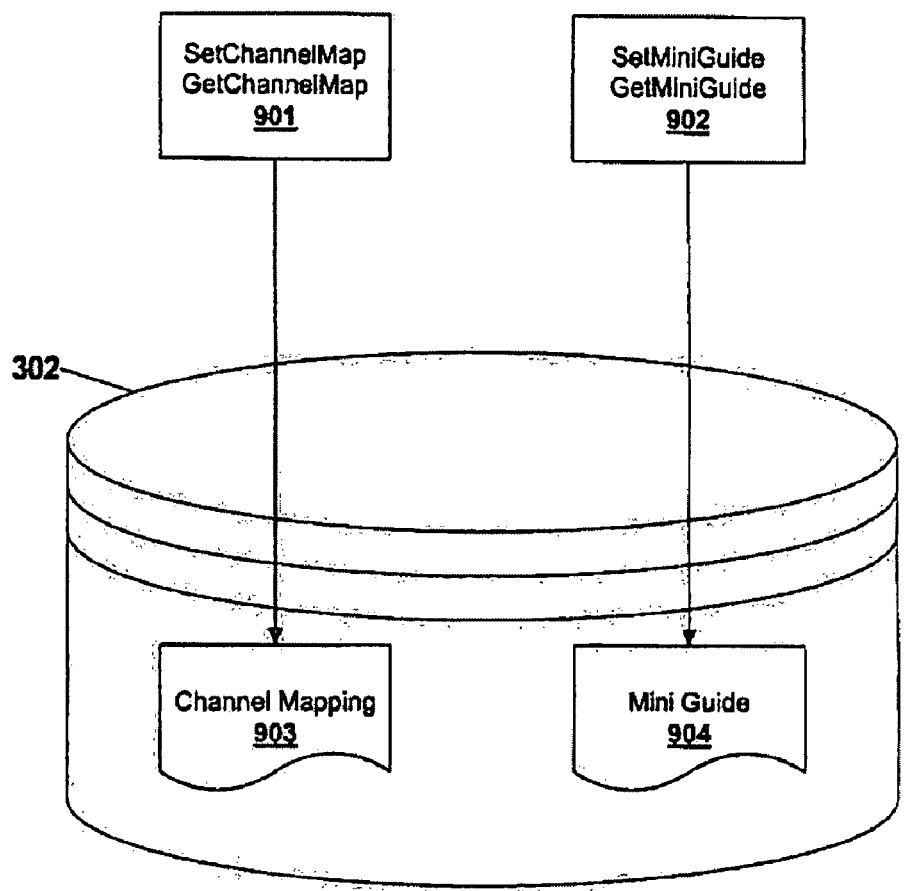
FIG. 7 is a block diagram showing an example of a mapping API of the APIs of FIG. 4 for mapping channels and storing the mappings in a database created using VBI transmitted data.

With reference to FIG. 7, an example of the Mapping API 403 provides functions for retrieving and setting mapping data for the system, such as for example, Get/SetChannelMap 901 and Get/SetMiniGuide 902. The data store 302 generally includes two tables for storing mapping data: Channel Mapping table 903, with about 100 rows, and Mini Guide table 904, with about 15 rows. Functions 901 may be called to read or update the Channel Mapping table 903. Examples of these functions 901 are described in Table 10A as MapGet and MapSet.

The MapGet function returns an array of channel mapping data describing the mapping among channels, call letters, categories, and channel identifiers. This function builds an array of channel mapping data stored by channel number. The function returns TRUE if an array of channel mapping data is successfully build and otherwise returns FALSE.

The MapSet function can be called to update the Channel Mapping table 903 in the data store 302. This function receives, as an argument, a data structure including search criteria such as a station's call letters, a short channel identifier, a channel, and a category. This function uses the search criteria to determine whether a corresponding entry exists. If an entry was already created, the system updates the information as requested. If no entry exists, a new entry is added to the Channel Mapping table 903 with the information supplied.

Similarly, the Mini Guide table 904 contains information regarding the mapping between channels and categories. The MiniGuideGet and MiniGuideSet functions 902 provide a mechanism for viewing and modifying data stored in the Mini Guide table 904. Aspects of one implementation of these functions 902 are described with reference to Tables 10A and 10B.

TABLE 10A

API for Channel Mapping

1. MapGet
    Description    This function returns an array of Channel Mapping data to the caller. Channel Mapping describes the mapping among Channel, Call letter, Category, and Channel Id.
    Prototype    Boolean MapGet(channel_map * const minfo, int * const sorder, int &length, query_error & err)
    Parameters    minfo: OUT PARAMETER. The pointer minfo points to an array of channel_map. The struct channel_map is defined as

```
struct channel_map
{
    char call_letter[9];
    unsigned short channel id;
    unsigned short channel;
    unsigned short cat;
}
``` sorder: OUT PARAMETER. It stores the order of Channel Mappings sorted in channel number.
        length: IN OUT PARAMETER. As an in parameter, length is the dimension of minfo and sorder, as an out parameter, it is the actual number of shows stored in minfo and sorder, provided the number is less than the input length. Otherwise, FALSE is returned and err is populated with messages.
        Err: OUT PARAMETER. This parameter holds error information if error occurs. Non-zero err_code means something wrong in the call.
    Return TRUE: Success
    Value FALSE: Fails to prepare tables for data loading.

2. MapSet
    Description    Caller can set Channel Information by calling this function. Inside of MapSet, it checks each element of the array minfo against the records in the database. If the call letter exists in the database, then update the row by the new data from minfo; if call letter doesn't exist in the database, then insert a new row into the database.
    Prototype    Boolean MapSet(channel_map * const minfo, int &length, query_error & err)
    Parameters    minfo: IN PARAMETER. The parameter minfo is an array of channel_map. The struct channel_map is defined as

```
struct channel_map
{
    char call_letter[9];
    unsigned short channel id;
    unsigned short channel;
    unsigned short cat;
};
``` length: IN PARAMETER. It is the actual number of Channel Mappings stored in minfo.
        Err: OUT PARAMETER. Non-zero err_code means something wrong in the call.
    Return TRUE: Success
    Value FALSE: Fails to prepare tables for data loading.

3. MiniGuideGet
    Description    To get Mini Guide data. Mini Guide shows the mapping between Category and Channel. At present, there are about 12 categories. Each Category owns a segment of Channels.
    Prototype    Boolean MiniGuideGet(mini_guide * const minfo, int * const sorder, int &length, query_error & err)

TABLE 10B

Parameters    minfo: OUT PARAMETER. minfo is an array of mini_guide. The data struct mini_guide is defined as

```
struct
{
    char name[15];              // Category
    unsigned short channel;     // Channel Number
    unsigned short offline;     // Channel number starts at
    unsigned short start;       // Channel segment starts at
    unsigned short end;         // Channel segment ends at
    unsigend short dup_start;   // Local Channel starts at
};
``` sorder: OUT PARAMETER. The order of Mini Guides by channel number.
        length: IN OUT PARAMETER. As an in parameter, length tells the TABLE 10B-continued dimension of minfo and sorder, as an out parameter, it is the actual number of Mini Guides stored in minfo and sorder, provided the number is less than the input length. Otherwise, FALSE is returned.
Err: OUT PARAMETER. Non-zero err_code means something wrong in the call.
Return TRUE: Success
Value FALSE: Fails to prepare tables for data loading
4. MiniGuideSet
    Description    Caller can set Mini Guides by calling this function. Inside of MiniGuideSet, each element of the array minfo is checked against the records in the database. If a category exists in the database, then update the row by the new data from minfo; if a category doesn't exist in the database, then insert a new row into the database.
    Prototype    Boolean MiniGuideSet(mini_guide * const minfo, int &length, query_error & err)
    Parameters
        minfo: IN PARAMETER. The pointer minfo points to an array of mini_guide.
        length: IN PARAMETER. It is the actual number of Mini Guides stored in minfo.
        Err: OUT PARAMETER. Non-zero err_code means something wrong in the call.
    Return TRUE: Success
    Value FALSE: Fails to prepare tables for data loading.

Figure 8:
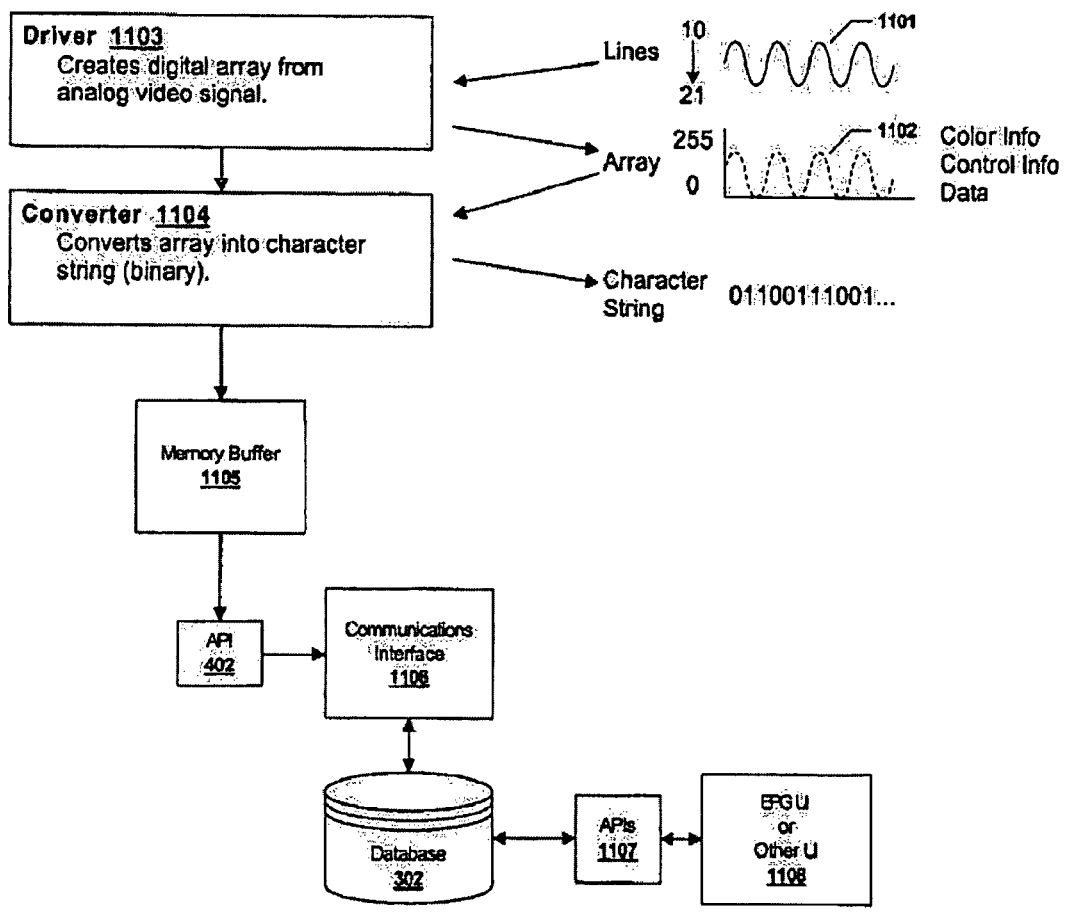
FIG. 8 is a block diagram showing an example of a system that receives, processes, and stores VBI transmitted data.

With reference to FIG. 8, a system is described for receiving and processing data from video signals in which the Data Loader API 402 uses data that has been received by receiving module 307 and processed by generating module 308.

The system receives a video signal 1101 as input and creates a digital value array 1102 using driver 1103. The output from driver 1103 serves as input to converter 1104. The output of converter 1104 is connected to memory buffer 1105. API 402 accesses memory buffer 1105 and communications interface 1106, which provides access to data store 302. Various APIs 1107 may be used to access data store 302 to support a user interface 1108.

More specifically, in one implementation, a video signal 1101 is received, sampled, and digitized into a digital value array 1102 by driver 1103. This array 1102 is converted into a character string by converter 1104. An API may be used to enable access to the data stored in the character stream. The accessed data is stored in memory buffer 1105, where it can be accessed by the Data Loader API 402 and stored in data store 302. The Data Loader API 402 accesses the data store 302 using a communications interface 1106. Commercial database usually include several communications interfaces that permit access to a database by an application running on the same machine as the database and by an application running on a different machine connected via a computer network. Once the data store 302 has been populated, various APIs 1107 such as the UI API 401, the Mapping API 403, and other APIs 404 may be used to access the data. FIG. 8 shows an EPG UI 1108 that uses an API 1107 (such as those described in FIG. 4) to access data.

Figure 9:
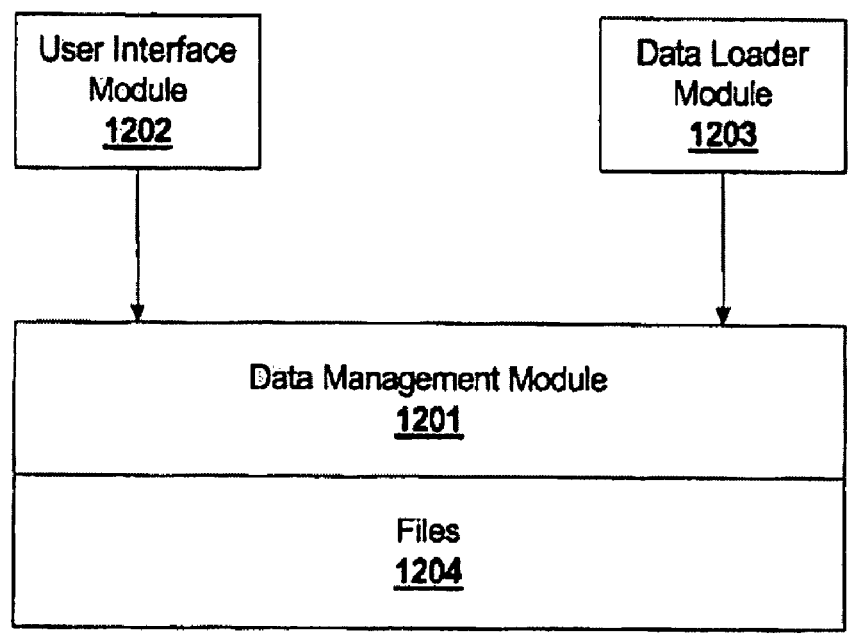
FIG. 9 is a block diagram showing an example of the data flow between various modules of a system.

With reference to FIG. 9 illustrates an exemplary data flow among several modules (e.g., a User Interface Module 1202, a Data Loader Module 1203, and a Data Management Module (DMM) 1201) and various files 1204. The DMM 1201 may be a general purpose database, or it may be designed as a specialized database as described herein for managing EPG data. For example, a special-purpose database may be designed that provides a high level of performance in a simple, stable, and small implementation with the ability to handle large volumes of data.

The Data Management Module 1201 is designed to store and manage electronic programming guide (EPG) data and other supportive information. In one implementation, limited memory resources are provided to decrease the overall cost. Because of the large volume of show information (1K per show) required by the system, the DMM 1201 may be designed to use as limited and/or to maximize performance in terms of stability and search times.

The data handled by the DMM 1201 generally come from two primary sources. One is the show data that are decoded and loaded into the data store 302 by the data loader and the other is for supportive purposes (e.g., Channel Mapping table 903 and Mini Guide table 904). DMM 1201 generally provides two groups of APIs to its callers. One group is for input data to the DMM 1201 (for example, from the Data Loader API 402), the other group is for querying and managing data in DMM (UI uses APIs of this group, for example).

Figure 10:
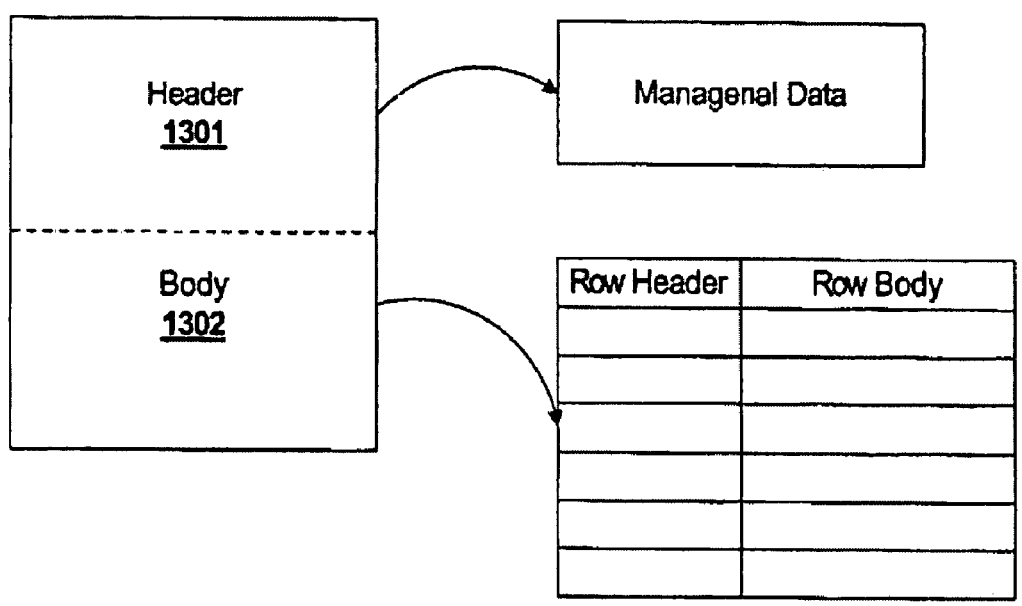
FIG. 10 is a block diagram showing a data structure for storing generic tables in a database containing VBI transmitted data.

Referring to FIG. 10, in DMM 1201, a table may be included in a file that stores formatted data. The file has two major data areas: a header area 1301 that contains managerial data, and a body area 1302 holds the data of the table. Further, the body area 1302 may be formed by rows with fixed lengths, with each row having its own row-header and row-body.

To create a DMM table, three structures generally are defined: (1) a table-header; (2) a row-header, and (3) a row-body. In general, table headers contain only managerial data. More specifically, a table header may include a table name, the date the table was created, the file name where the table is stored, the total number of initialized rows, the next available row for insertion, the length of the header, the length of a row, the length of a row-body, and the position of one or more reference data (e.g., start of row-header data).

Similarly, a row-header may be unique for every row and every table, containing managerial data indicating a row identifier, a flag indicating whether the row is use, and the next available row. A row-body is determined by data stored in the table. Different tables have different row-body definitions. For example, Table 14 describes an exemplary implementation of a structure for a table header and a row header.

TABLE 14

```
struct adr_hdr;
{
        char_name[30];
        char f_name[30];
        char c_date[15];
        long t_row;
        long a_row;
        long na_row;
        short hdr_len;
        short row_start;
```

TABLE 14-continued

```
        short row_len;;
        short row_hdr_len;
        short row_bdy_len;
        short row_hdr start;
    };
where
        Name: Table name
        C_date: When the table is created, in the form
            "YYYYMMDDHHMISS"
        F_name: the file where the data is stored
        T_row: Total number of initialized rows
        Na_row: Next available row id for insertion
        Hdr_len: length of the header
        Row_start: where the data (row) start (=hdr_len);
        Row_len: the length of a row
        Row_hdr_len: length of the row header
        Row_bdy_len: the length of the row-body
        Row hdr start: Where the row-header starts
    Struct row_hdr
    {
        long row_id;
        long next_available_row;
        char usage;
    }
where
        Row_id: row id of the row. Increased by one each time
        Next_avaialble_row: row id of the next available row for
        insertion.
        usage: 'N' means available; 'Y' means used.
```

Figure 11:
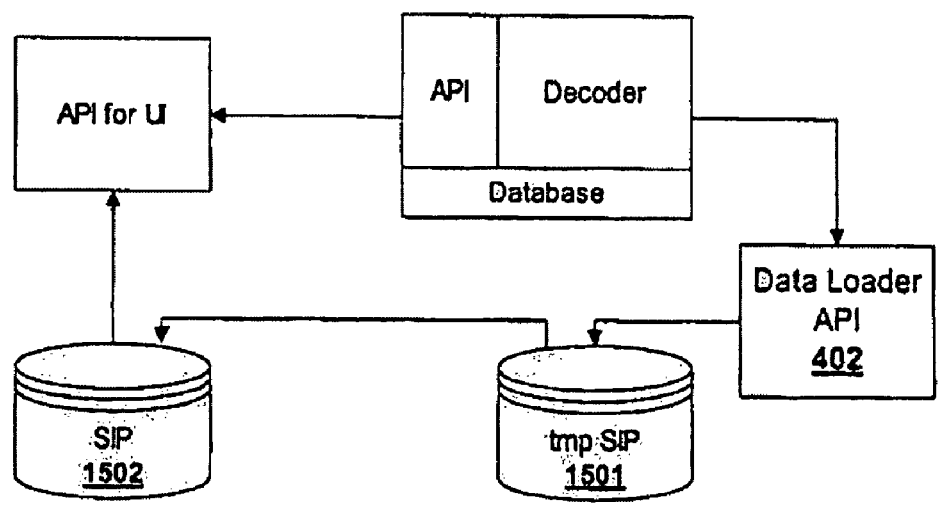
FIG. 11 is a block diagram showing an example of a system for updating files and database tables.
Figure 12:
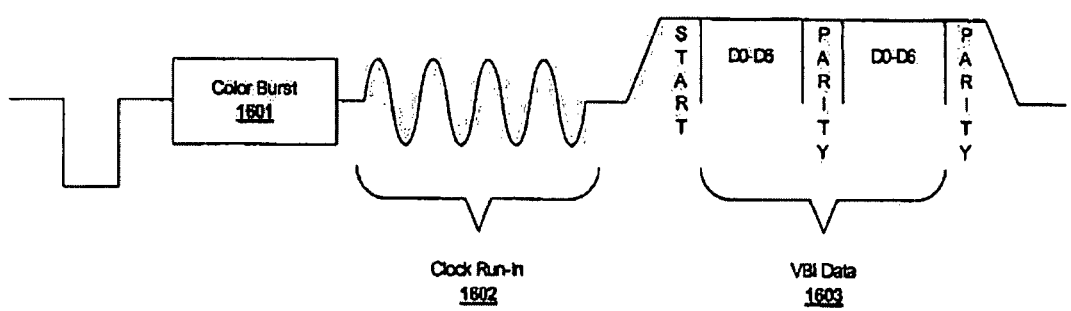
FIG. 12 shows an example of a video signal containing VBI data.

FIG. 11 illustrates a system including call-back functions to assist in preserving RAM space. In one implementation, video data and show information data are separated and stored on a hard disk or other computer readable medium. A group of call-back functions are provided to store decoded show information into files or database tables. FIG. 11 illustrates how the Data Loader API 402 may operate to access this data. The system maintains a temporary database table 1501 of show programming information for an electronic programming guide. When the system calls the StartLoading function, the temporary database table 1501 is created. Calls to WritSip instruct the system to write to the temporary database table 1501. When the EndLoading function is called, the temporary database table 1501 is used to update the actual database table 1502 and the indexes are updated accordingly. Users accessing the primary database may not have access to the updated data until the update is complete.

A number of implementations have been described. It is also possible to apply the techniques discussed herein with analog and/or digital video signals. Use in the context of digital video signals will be enhanced as the amount of VBI data included in digital video signals is increased.

Nevertheless, it will be understood that various modifications may be made. Accordingly, other implementations are within the scope of the following claims.

What is claimed is:

1. At least one computer-readable storage medium storing at least one computer program, the at least one computer program comprising executable instructions that, when executed by a processor, perform operations comprising:
    receiving data representing information communicated in a vertical blanking interval of a video signal;
    generating digital data based on the data using a predetermined algorithm; and
    storing the generated data on a storage medium,
    wherein:
        receiving the data includes:
            periodically sampling at least a portion of the video signal containing the information,
            generating a numeric representation of the information including an array of values based on samples from sampling the portion of the video signal, and
            receiving the array as at least a portion of the data; and
        generating the digital data includes
            converting values from within the array of values to at least one binary character string;
            computing an average of several of the array values;
            biasing the average to establish a cutoff value; and
            classifying the information as electronic programming guide data based on whether the received data exceeds the cutoff value.

2. The at least one computer-readable storage medium of claim 1, wherein the data includes non-video information and receiving the data includes receiving data representing non-video information.

3. The at least one computer-readable storage medium of claim 1, wherein the video signal is a cable broadcasted video signal such that receiving the data includes receiving data communicated with the cable broadcasted video signal.

4. The at least one computer-readable storage medium of claim 1, wherein the video signal is a satellite broadcasted video signal such that receiving the data includes receiving data communicated with the satellite broadcasted video signal.

5. The at least one computer-readable storage medium of claim 1, wherein the video signal is a terrestrial broadcasted video signal such that receiving the data includes receiving data communicated with the terrestrial broadcasted video signal.

6. The at least one computer-readable storage medium of claim 1, wherein receiving the data receiving data representing the information communicated with the video signal from among a vertical blanking interval of the video signal.

7. The at least one computer-readable storage medium of claim 1, wherein at least one of the at least one computer program is an embedded software application.

8. The at least one computer-readable storage medium of claim 1, wherein generating the digital data includes converting the data into a format that is used to generate an electronic programming guide.

9. The at least one computer-readable storage medium of claim 1, wherein computing the average of several of the array values includes computing a moving average based on the values.

10. The at least one computer-readable storage medium of claim 1, wherein classifying the information includes classifying the information as a clock run in when the average exceeds the cutoff value.

11. The at least one computer-readable storage medium of claim 1, wherein the array of values represent at least color information and control information.

12. A method for making data derived from a video signal accessible, comprising:
    receiving data representing information communicated in a vertical blanking interval of a video signal;
    generating digital data based on the data using a predetermined algorithm; and
    storing the generated data on a storage medium,
    wherein:
        receiving the data includes:
            periodically sampling at least a portion of the video signal containing the information,
            generating a numeric representation of the information including an array of values based on samples from sampling the portion of the video signal, and
            receiving the array as at least a portion of the data; and generating the digital data includes:
   converting values from within the array of values to at least one binary character string;
   computing an average of several of the array values;
   biasing the average to establish a cutoff value; and
   classifying the information as electronic programming guide data based on whether the received data exceeds the cutoff value.

\* \* \* \* \*